United States Patent Office 2,768,081
Patented Oct. 23, 1956

2,768,081
POULTRY AND LIVESTOCK FEED

Frank Harold Buckwalter, Dewitt, N. Y., assignor to Bristol Laboratories Inc., Syracuse, N. Y., a corporation of New York No Drawing. Application January 12, 1953,
Serial No. 330,902

2 Claims. (Cl. 99—4)

This invention relates to poultry and livestock feeds which stimulate growth and increase efficiency of utilization of food and, more particularly, to poultry and livestock feeds containing levo-erythro-ephenamine benzylpenicillin.

The value of non-toxic salts of penicillin as supplements in poultry and livestock feeds is well established. Penicillin is presently held to be superior to all other antibiotics in poultry feeds and to be the equal of any other antibiotics in swine feeds. Penicillin is also useful in calves up to the age of six months. It is also known (see B. H. Schneider and H. H. Brugman, The State College of Washington, Institute of Agricultural Sciences, Stations Circular No. 115, September, 1950) that pelleted feeds, as compared to the same feeds ground and unpelleted, give greater gains in weight per pound of feed in chickens and pigs. Virtually all duck feed is presently pelletized. As reported by M. M. Nixon (Feedstuffs, volume 22, page 67, December 9, 1950), in pelletizing chick or laying mashes, it is necessary to add steam at from 60 to 90 lbs. pressure to the feed in order to pelletize satisfactorily. Some formulae containing soybean oil meal may require water as well as steam.

The salts of penicillin, such as procaine penicillin, are unfortunately quite unstable in the presence of the countless ingredients of commercial feeds, both when stored at about room temperature with up to the usual maximum tolerated eight or ten percent moisture and particularly when exposed to steam at elevated temperatures during a processing operation such as pelletizing. It is an object of this invention to provide a poultry and livestock feed containing penicillin which is stable on storage and when exposed to steam during pelletizing. It is a further object of this invention to provide premixes of penicillin and suitable diluents which will produce such a stable product when incorporated into commercial poultry and livestock feeds.

The objects of this invention have been achieved and there are now discovered according to the present invention poultry and livestock feeds containing levo-erythro-ephenamine benzylpenicillin.

The use of steam under pressure in pelletizing feeds containing supplementary salts of penicillin has been found to be highly detrimental to the stability of most penicillin salts, e. g. procaine penicillin G and N,N'-dibenzylethylenediamine dipenicillin G. This may be determined by mixing the penicillin into feed, spreading the mixture in a thin layer, exposing it to steam for ten minutes and then assaying. The procaine penicillin G and N,N'-dibenzylethylenediamine dipenicillin G are about 67% to 85% destroyed and melamine penicillin G and dehydroabietylamine penicillin G are completely destroyed and both dextro- and racemic-erythro-ephenamine penicillin G show too high a loss of activity, whereas 1 - erythro - N - methyl - 2 - hydroxy - 1,2 - diphenyl-ethylamine penicillin G (herein called 1-erythro-ephenamine penicillin G) is only ten percent destroyed. This useful and unexpected stability to steam of feeds containing 1 - erythro - ephenamine benzylpenicillin is unexpected and unpredictable from the known solubilities, which are

| Salt of Penicillin | Approximate Aqueous Solubility in units/ml. |
|---|---|
| Melamine penicillin G | 8,700 |
| Procaine penicillin G | 5,000 |
| 1-erythro-Ephenamine penicillin G | 1,200–1,350 |
| Dehydroabietylamine penicillin G | 125 |
| N,N'-Dibenzylethylenediamine dipenicillin G | 100–150 |

Thus, it would be predicted that the last two, which are very insoluble, would be the most stable to steam but it is surprisingly found by this invention that only feeds containing the 1 - erythro - ephenamine salt exhibit useful stability to steam. It is also found that feeds containing 1 - erythro - ephenamine penicillin G are equivalent, in power of stimulating growth and efficient utilization of food, to feeds containing procaine penicillin G when fed at levels down to one gram per ton in chick growth tests and are also equivalent in swine growth studies, provided of course that the procaine penicillin G has not been destroyed by steam during processing.

It is further found that feeds, e. g. GLF chicken feed, containing 1-erythro-ephenamine are stable upon storage without steaming whereas feeds containing procaine penicillin G, N,N'-dibenzylethylenediamine dipenicillin G, dehydroabietylamine penicillin G and dextro-erythro-ephenamine penicillin G are not stable upon storage without steaming. This instability is more easily and quickly observed at elevated temperatures.

Feeds were prepared (without steaming) containing one gram of penicillin salt per 2000 grams GLF chicken feed, stored at 56° C. for one month and assayed. The loss in penicillin activity was 95% for procaine penicillin, 97% for N,N'-dibenzylethylenediamine dipenicillin G and 52% for 1 - erythro - ephenamine penicillin G. At 14–20 g./2000 g. feed the loss in penicillin activity was 90–100% for dehydroabietrylamine penicillin G (one month at 56° C.). The loss in activity for the two isomers of erythro-ephenamine penicillin G stored 2 months at 37° C. was about 10% for levo and about 60% for dextro.

Feeds were prepared (without steaming) containing two grams of penicillin per ton of GLF chicken feed, stored at 56° C. for one month and assayed by the usual penicillin in vitro assay. The loss in penicillin activity was 88% for procaine penicillin G and 3% for 1-erythro-ephenamine penicillin G. The loss in penicillin activity was similarly 53% for feed containing dehydroabietylamine penicillin G and stored one month at only 37° C.

The improved stability of feeds containing 1-erythro-ephenamine penicillin G and the instability of like feeds containing dehydroabietylamine penicillin G is further unexpected in view of the stability of dehydroabietylamine penicillin G alone. Thus, dehydroabietylamine penicillin G alone is stable for one hour at 120° C. as a dry powder and for 5 to 10 minutes at 120° C. exposed to steam in an autoclave; under these conditions procaine penicillin G, melamine penicillin G and N,N'-dibenzylethylenediamine dipenicillin G decompose completely.

N-methyl-1,2-diphenyl-2-hydroxy-ethylamine may also be named as alpha, beta-diphenyl-beta-hydroxy-N-methyl-ethylamine or by the generic name ephenamine given to this compound in the Federal Register in the issue of June 7, 1951. For convenience and brevity, the term ephenamine will be used below and shall be understood to mean N-methyl-1,2-diphenyl-2-hydroxy-ethylamine and likewise the four isomers shall be referred to as levo-erythro - dextro - erythro-, levo - threo- and dextro-threoephenamine. Levo and dextro are often abbreviated as l- and d- respectively.

V. U. Young in J. Amer. Pharm. Assoc. (Sci. Ed.) 40, 261–262 (June, 1951) describes properties and methods of preparation of certain isomers of ephenamine and its penicillin salts. V. Young et al. in Federation Proceedings 10, 277 and 336 (1951) present evidence of the lack of toxicity and the therapeutic activity in animals of ephenamine penicillin.

The ephenamine of the present invention has the following formula

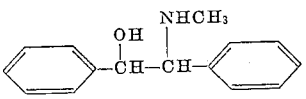

It is apparent that there are two asymmetric carbon atoms in this amine. Thus, this amine exists in structural as well as optical isomeric forms. The term "structural" isomer or form as used herein refers to the cis or trans relationship, that is, the planar relationship of the polar groups on the two asymmetric carbon atoms. To differentiate between these two possible forms we will subsequently refer to the cis compounds as the "erythro" series or form and to the trans diastereoisomers as the "threo" series or form. Such cis or erythro compounds are products wherein the two most highly polar of the groups on the asymmetric carbon atoms lie on the same side of the plane of the two carbon atoms. Conversely, the trans or threo compounds are those wherein the two most highly polar groups lie on opposite sides of the plane of the two carbon atoms.

The assignments of cis and trans formulation to the proper members of a pair of diastereoisomers is classically a difficult problem and fraught with possibilities of error. It is therefore to be recognized and understood that the assignments herein of erythro and threo structures are made on good evidence but are not to be considered final but rather to serve a useful purpose in providing terms to describe the series of compounds under discussion at any time.

Both the erythro and threo forms exist as racemates of the optically active dextro [d] and levo [l] rotary isomers as well as in the form of the individual or separated dextro [d] and levo [l] optical isomers. The assignment of a compound to [d] or [l] series is based as usual upon the direction in which it rotates the plane of polarized light, [d] being to the right or positive, often written (+).

It is to be understood that the present invention contemplates the use only of material which is composed almost entirely of the erythro isomer and contains only as much of the threo isomer as cannot be removed by economical and practical methods of large-scale production. It is to be further understood that the preferred salt of penicillin to be used in this invention is the levo-erythro-ephenamine penicillin G in as nearly pure form as is practical.

The preparation of mixtures of racemic-threo- and racemic-erythro-ephenamine is described by Klavehn [Ger. Patent 525,839] and by Skita and Keil [Ber. 62B, 1142 (1929)]. Racemic-erythro-ephenamine may be prepared in nearly pure form by the method or Wheatley and Cheney's prior, co-pending application of Serial No. 223,833. Thus, a mixture of 21 grams of benzil, 37.2 grams of a 25% aqueous methylamine solution, about 20 ml. of an aqueous slurry containing about 59% by weight of Raney nickel and 100 ml. of methanol was shaken at room temperature under hydrogen at approximately three atmospheres pressure. After 40 minutes, 92% of the theoretical pressure drop had occurred. Shaking was stopped and 150 ml. of methanol was added to the reaction mixture, which was then heated until all the aminoalcohol dissolved and then filtered while hot to remove the catalyst. The filtrate was concentrated as far as possible under reduced pressure and taken up in 200 ml. of a 3:1 mixture of toluene and chloroform. Upon the addition of 100 ml. of 6N hydrochloric acid, the white, solid ephenamine hydrochloride precipitated instantly. The material was chilled in ice and the solid was collected by filtration and recrystallized from 250 ml. of water to which 50 ml. of 12N hydrochloric acid was added while hot. There was obtained ephenamine hydrochloride melting at about 254°–255° C. with decomposition. The material thus prepared was the practically pure racemic erythro isomer. The free base isolated therefrom by the usual means had a melting point of 129°–132° C. and yielded an acetate melting at about 147°–149° C. with prior softening and a sulfamate melting at about 186.5°–187.5° C. with decomposition. The acetate and sulfamate are more soluble in water than the hydrochloride.

Treatment in water of one mole of sodium penicillin G with two moles of racemio-erythro-ephenamine hydrochloride yields a crystalline precipitate of amine penicillin G salt, which after recrystallization from isopropyl alcohol or a mixture of dimethylformamide (1 part) and diethyl ether (3 parts) is found to melt at about 182°–183° C. (corrected), to be soluble in water at 25° C. to the extent of about 1350 units per ml., to have $[\alpha]_D^{25}$ of about +108°, $c=1$ in methanol, and to be practically pure levo-erythro-ephenamine penicillin G. The theoretical potency of the solid salt is 1058 units per milligram. The application of the usual methods of recovery to this salt regenerates levo-ehythro-freebase, M. P. about 126°–128° or as high as 129.5° C. $[\alpha]_D^{25}$=approximately −36.7°, $c=1$ in methanol and levo-erythro-amine hydrochloride, M. P. about 268.5°–269.5° with decomposition, $[\alpha]_D^{25}$= approximately −145°, $c=1$ in methanol.

The dextro-rotary aqueous solution above from which the levo-erythro-ephenamine penicillin precipitated and was removed, contains fairly pure dextro-erythro-ephenamine hydrochloride. This material may be further purified in the usual way, as by adding small amounts of sodium penicillin to complete precipitation of the levo-erythro isomer. Nearly pure dextro-erythro-ephenamine is then isolated and found to melt at about 126°–129° C., to have $[\alpha]_D^{25}$ of about +35.1° to +38.5°, $c=1$ in methanol, to yield a hydrochloride of M. P. 268.5° −269.5° with decomposition and of $[\alpha]_D^{25}$ of about +143°, and to yield a salt of penicillin G melting approximately at 139°–142° C., having a solubility in water at 25° of about 11,800 units per ml. and having $[\alpha]_D^{25}$ of about +233°, $c=1$ in methanol.

While the present invention has been described with particular reference to amine salts of penicillin G, and particularly the levo-erytho-ephenamine salt of penicillin G, it is to be understood that salts of other penicillins are also included within the scope of this invention. For instance, the pencillins G, F, X, O, dihydro F and K, and mixtures of two or more such penicillins, particularly mixtures containing at least 85% penicillin G, are included within the scope of this invention.

Further understanding of the invention may be obtained by reference to the following examples which are illustrative only and are not the exclusive embodiment of the invention.

*Example I* l-erythro-ephenamine penicillin G is mixed at the ratios of 2, 4, 6, 8, and 10 grams per ton of feed with a feed for growing, fattening pigs of the following composition:

| | Percent |
|---|---|
| Barley | 57 |
| Peas | 26.5 |
| Alfalfa | 10. |
| Meat Meal | 5. |
| Iodized salt | 0.5 |
| Bone meal | 0.5 |
| Ground limestone | 0.5 |

This feed is stable on storage and may be pelletized without substantial loss of penicillin activity.

Example II 1-erythro-ephenamine penicillin G is mixed at the ratios of 0.5, 1, 5, and 10 grams per pound of mixtures of the following diluents:

|  | #1 | #2 |
|---|---|---|
|  | Percent | Percent |
| Fuller's Earth | 40 | 20 |
| Anhydrous Dicalcium Phosphate | 20 | 20 |
| Soya meal | 40 | 20 |
| Penicillin Mat |  | 20 |
| Kaolin |  | 20 |

Suitable diluents, all of which may be used alone or in combination, include fuller's earth, kaolin, anhydrous dicalcium phosphate, calcium carbonate, penicillin mat, soya meal, dehydrated alfalfa meal, defluorinated phosphate, feeding calcium, soy-grits, and soy-corn gluten meal. The mixtures so produced are called "pre-mixes" and are added to commercial swine and poultry feeds in amounts of about one to two pounds per ton of feed. The fortified feeds so produced are used as is or are pelletized, particularly when used to feed ducks. Such fortified, unpellitized feeds are stable, whereas, similar feeds containing N,N'-dibenzylethylenediamine dipenicillin G or procaine penicillin G show about 100% and about 20% loss of activity respectively after storage of the feed for six weeks.

Example III 1-erythro1ephenamine penicillin G is mixed at the ratios of 2, 4, 6, 8, and 10 grams per ton of feed with a broiler mash of the following composition: Ground yellow corn, 55.7%; alfalfa leaf meal, 5.0%; soybean meal, 26.0%; corn gluten meal, 5.0%; fish meal, 4.0%; butyl fermentation solubles, 0.6%; steamed bone meal, 2.0%; oyster shell, 1.0%; manganized salt, 0.5%; Vitamin A and D Feeding Oil, 0.2% and Vitamin $B_{12}$ Supplement at about 12 mgms. $B_{12}$ per ton.

This feed is stable on storage and may be pelletized without substantial loss of penicillin activity.

In addition to the usual vitamins, minerals, proteins, fats and carbohydrates in the ingredients of feeds, there may be added to the products of the present invention other antibiotics such as aureomycin, terramycin, and bacitracin as well as animal protein factor and members of the $B_{12}$ family.

It will be understood that, without departing from the spirit of the invention or the scope of the claims, various modifications may be made in the specific expedients described. The latter are illustrative only and not offered in a restricting sense, and there is no intention of excluding any equivalents of the features shown and described or portions thereof.

I claim:

1. The process which comprises combining poultry and livestock nutrient feed materials and 1-erythro-ephenamine penicillin G, and pelletizing the mixture in the presence of steam to produce pelletized antibiotic poultry and livestock feed supplements containing said penicillin salt in subtantially undecomposed condition.

2. The process which comprises combining poultry and livestock nutrient feed materials and 1 to 10 grams 1-erythro-ephenamine penicillin G per ton of feed material, and pelletizing the mixture in the presence of steam to produce pelletized antibiotic poultry and livestock feed supplements containing said penicillin salt in substantially undecomposed condition.

References Cited in the file of this patent

UNITED STATES PATENTS

| 2,585,436 | Cheney | Feb. 12, 1952 |
| 2,585,512 | Staab | Feb. 12, 1952 |
| 2,645,638 | Young | July 14, 1953 |